(12) United States Patent
Kawai et al.

(10) Patent No.: US 7,369,611 B2
(45) Date of Patent: *May 6, 2008

(54) IMAGE CODING APPARATUS AND METHOD OF THE SAME

(75) Inventors: Kenji Kawai, Tokyo (JP); Koji Takahashi, Kanagawa-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/189,928

(22) Filed: Jul. 27, 2005

(65) Prior Publication Data

US 2005/0259731 A1     Nov. 24, 2005

Related U.S. Application Data

(62) Division of application No. 09/038,707, filed on Mar. 9, 1998, now Pat. No. 6,952,448.

(30) Foreign Application Priority Data

Mar. 11, 1997   (JP)   ................... 9-055970

(51) Int. Cl.
*H04N 7/12* (2006.01)
(52) U.S. Cl. ............ 375/240.12; 375/240; 375/240.01; 375/241.02
(58) Field of Classification Search .............. 375/240, 375/240.01, 240.02, 240.12; 348/143
See application file for complete search history.

(56) References Cited

U.S. PATENT DOCUMENTS

| | | | |
|---|---|---|---|
| 4,698,672 A * | 10/1987 | Chen et al. ............ | 375/240.12 |
| 5,237,410 A | 8/1993 | Inoue ..................... | 358/136 |
| 5,333,012 A | 7/1994 | Singha et al. ............ | 348/405 |
| 5,357,281 A | 10/1994 | Ikeda et al. .............. | 348/401 |
| 5,402,171 A | 3/1995 | Tagami et al. ........... | 348/219 |
| 5,500,677 A | 3/1996 | Fert ........................ | 348/402 |
| 5,550,847 A | 8/1996 | Zhu ......................... | 714/748 |
| 5,598,213 A | 1/1997 | Chung et al. ............ | 348/405 |
| 5,845,011 A | 12/1998 | Miyamoto et al. ....... | 382/232 |
| 5,926,209 A * | 7/1999 | Glatt ....................... | 348/143 |
| 5,926,224 A | 7/1999 | Nagasawa .............. | 375/240.14 |

FOREIGN PATENT DOCUMENTS

| | | |
|---|---|---|
| EP | 0593275 A1 | 4/1994 |
| EP | 0695093 A2 | 1/1996 |
| JP | 04-068989 | 3/1992 |
| JP | 07-107466 | 4/1995 |
| JP | 07-162853 | 6/1995 |
| WO | 9704597 A | 2/1997 |

* cited by examiner

*Primary Examiner*—Allen Wong
(74) *Attorney, Agent, or Firm*—Fitzpatrick, Cella, Harper & Scinto (57) ABSTRACT

There are provided image coding apparatus and method in which image data is inputted, a continuous change is given to the input image data, the image data is coded, a coding condition when coding the input image data is controlled in accordance with the continuous changing process, and the image data is coded.

22 Claims, 7 Drawing Sheets

QUANTIZATION STEP SIZE : 3>2>1

FIG.6B

QUANTIZATION STEP SIZE : 3>2>1

IMAGE CODING APPARATUS AND METHOD OF THE SAME

RELATED APPLICATION

This application is a divisional of application Ser. No. 09/038,707, filed Mar. 9, 1998, now U.S. Pat. No. 6,952,488 the entire contents of which are incorporated herein by reference.

BACKGROUND OF THE INVENTION

1. Field of the Invention

The invention relates to image coding apparatus and method for efficiently coding image data.

2. Related Background Art

An MPEG (Moving Picture Experts Group) system is widely known as a system for highly efficiently compressing and coding motion image data. The MPEG system is a coding system in which a discrete cosine transformation (DCT), an adaptive quantization, and a variable length coding are used as fundamental techniques and an interframe (or interfield) predictive coding with motion compensation based on a frame (or field) correlation is adaptively combined.

Specifically speaking, an I picture in which each frame is coded in a picture plane, a P picture which is interframe (or interfield) motion compensation predictive coded from the I picture that is preceding with respect to the time, and a B picture which is interframe (or interfield) motion compensation predictive coded from both of the preceding I picture (or P picture) and the subsequent I picture (or P picture) are arranged in accordance with a proper order, thereby accomplishing a high compression ratio.

A recent image coding system has a construction which can be also called a set of various coding techniques. Among the various coding methods, there are advantages and disadvantages depending on a photographing situation or an object. However, which coding method is used is proper can be discriminated for the first time by analyzing an image signal inputted to a compression processing circuit.

The MPEG system is what is called a collective method of those composite coding methods. A camera integrated type recording and reproducing apparatus using the MPEG system has already been manufactured as an article of commerce.

According to the MPEG system, since an inter-picture plane correlation is used, a compression ratio is higher than that of a compression coding system of a conventional digital VCR for industrial use, a longer time recording can be performed with a smaller recording capacity, and it is suitable for a portable camera apparatus.

However, the MPEG system is not suitable to form a predictive coding image for a period of time of the camera operation such as zoom-in (enlargement), zoom-out (reduction), or the like. That is, since it is difficult to obtain a correlation between the picture planes during the zooming operation, a large amount of unnecessary data is generated due to prediction errors. Not only a coding efficiency deteriorates but also a picture quality deteriorates.

SUMMARY OF THE INVENTION

From a background as mentioned above, it is an object of the invention to provide coding apparatus and method in which a photographed image which gives a continuous change for image data can be promptly and efficiently coded without deteriorating a coding efficiency and a picture quality.

According to one preferred embodiment of the invention, this object is accomplished by an image coding apparatus comprising: input means for inputting image data; image changing means for giving a continuous change to the image data; coding means for coding the image data; and control means for controlling coding conditions of the coding means in accordance with an output of the changing means.

According to another preferred embodiment of the invention, there is provided an image coding method comprising: an image changing step of giving a continuous change to input image data; a coding step of coding the image data; and a control step of controlling a coding condition of the coding means in accordance with a process in the changing step.

Other objects, features and advantages of the invention will become apparent from the following detailed description taken in conjunction with the accompanying drawings.

DETAILED DESCRIPTION OF THE PREFERRED EMBODIMENTS

The first embodiment according to the invention will now be described in detail hereinbelow with reference to the drawings.

Figure 1:
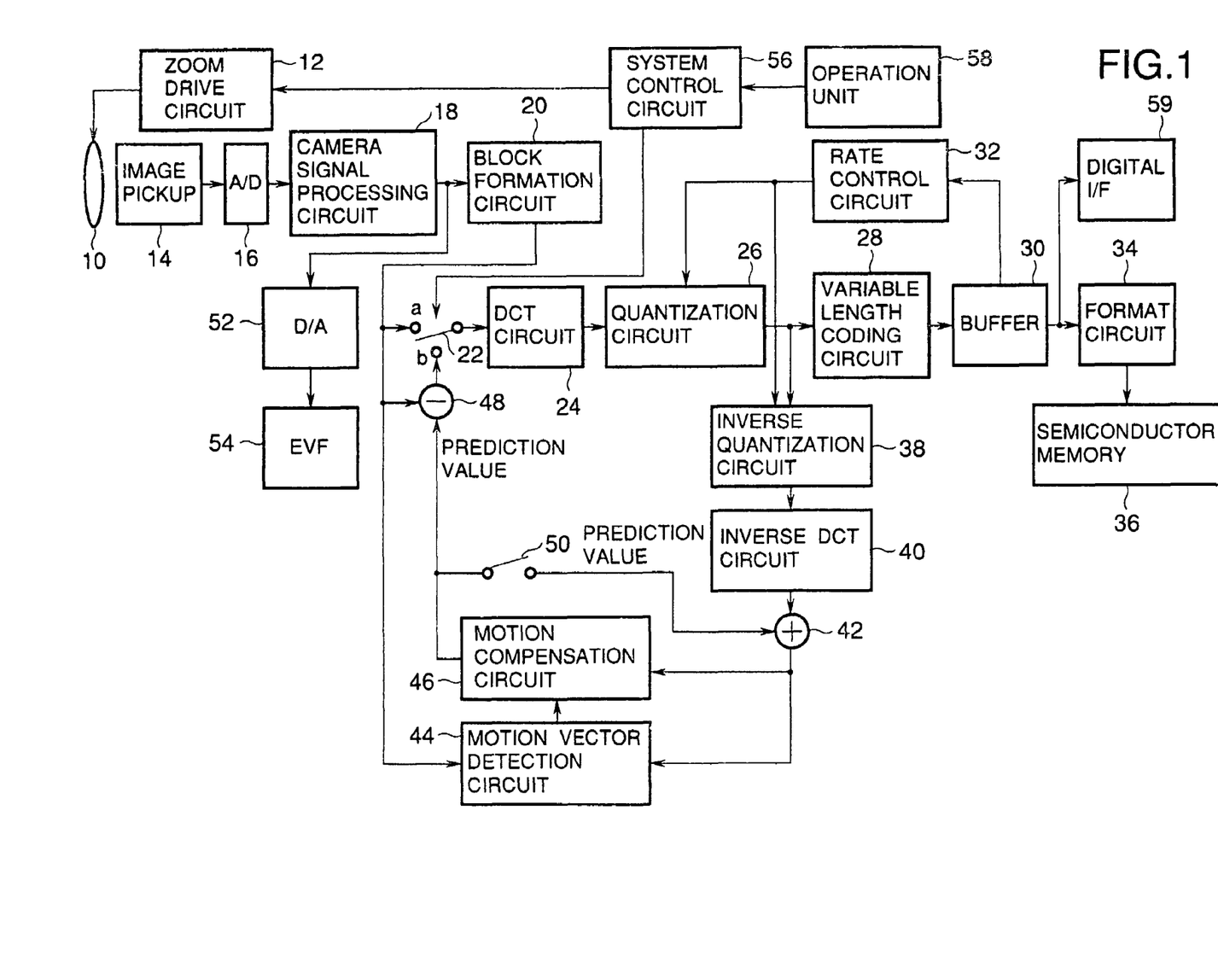
FIG. 1 is a block diagram showing a construction of a digital video camera of the first embodiment according to the invention.

FIG. 1 is a block diagram showing a construction of a digital video camera of the first embodiment according to the invention. Reference numeral 10 denotes a photographing lens constructed by a plurality of lens groups; 12 a zoom drive circuit for zooming the photographing lens 10; 14 an image pickup for converting an optical image obtained by the photographing lens 10 into an electric signal; 16 an A/D converter for converting an analog output of the image pickup 14 into a digital signal; and 18 a camera signal processing circuit for performing well-known camera signal processes such as gamma correction, color balance correction, and the like to output data of the A/D converter 16.

Reference numeral 22 denotes a switch for selecting image data (a contact) of a block unit from a block formation circuit 20 or a prediction error (b contact) between the actual picture plane and a predictive picture plane; 24 a DCT circuit for discrete cosine transforming an output of the switch 22 and outputting DCT coefficient data; 26 a quantization circuit for quantizing the DCT coefficient data outputted from the DCT circuit 24 by a designated quantization step size; 28 a variable length coding circuit for variable length coding an output of the quantization circuit 26; 30 a buffer for storing an output of the variable length coding circuit 28; and 32 a rate control circuit for controlling a quantization step of the quantization circuit 26 in accordance with a data amount in the buffer 30.

Reference numeral 34 denotes a format circuit for converting data from the buffer 30 into a recording format in a semiconductor memory 36.

Reference numeral 38 denotes an inverse quantization circuit for inversely quantizing the output of the quantization circuit 26; 40 an inverse DCT circuit for inversely discrete cosine transforming an output of the inverse quantization circuit 38. Reference numeral 42 denotes an adder for adding a predictive value to an output of the inverse DCT circuit 40 and outputting a resultant value in an inter-picture plane predictive coding mode (inter-coding mode) [P picture (forward prediction) and B picture (two-way prediction)] or for outputting the output of the inverse DCT circuit 40 as it is in an intra-picture plane coding mode (intra-coding mode) (I picture). Reference numeral 44 denotes a motion vector detection circuit for comparing an output of the adder 42 with image data of the present picture plane from the block formation circuit 20 and detecting a motion on a block unit basis of a predetermined size. Reference numeral 46 denotes a motion compensation circuit for moving image data of a predictive picture plane in the picture plane so as to set off the motion in accordance with a motion vector detected by the motion vector detection circuit 44. An output of the motion compensation circuit 46 is supplied as a prediction value to the adder 42 through a subtractor 48 and a switch 50. The subtractor 48 calculates a difference between the output of the block formation circuit 20 and the output (prediction value) of the motion compensation circuit 46, namely, a prediction error and supplies to a b contact of the switch 22.

Reference numeral 52 denotes a D/A converter for converting the digital output of the camera signal processing circuit 18 into an analog signal; and 54 an electronic view finder for displaying a video image according to an output signal of the D/A converter 52. Thus, the user can observe the video image during the photographing or during the photographing preparation.

Reference numeral 56 denotes a system control circuit for controlling the whole apparatus; 58 an operation unit comprising operation keys for the user to input various instructions to the system control circuit 56; and 59 a digital interface (for example, IEEE1394).

The operation of the embodiment will now be described. The image pickup 14 converts the optical image obtained by the photographing lens 10 into the electric signal. The output signal of the image pickup 14 is converted into the digital signal by the A/D converter 16 and is subjected to well-known camera signal processes by the camera signal processing circuit 18.

The block formation circuit 20 divides the image data outputted from the camera signal processing circuit 18 into blocks of (8 pixels×8 pixels). An output of the block formation circuit 20 is supplied to the a contact of the switch 22, subtractor 48, and motion vector detection circuit 44. The subtractor 48 calculates a difference (prediction error) between the pixel data from the block formation circuit 20 and the prediction value outputted from the motion compensation circuit 46 and supplies to the b contact of the switch 22. The switch 22 is connected to the a contact in the I picture [intra-picture plane coding mode (intra-coding mode)] and is connected to the b contact in the B picture [inter-picture plane coding mode (inter-coding mode)]. Therefore, in the I picture, the output of the block formation circuit 20 is supplied to the DCT circuit 24. In the P picture or the B picture, the output (prediction error) of the subtractor 48 is supplied.

The DCT circuit 24 discrete cosine (DCT) transforms the data from the switch 22 on a block unit basis and outputs DCT coefficient data to the quantization circuit 26. The quantization circuit 26 quantizes the DCT coefficient data from the DCT circuit 24 by a quantization step size designated by the rate control circuit 32. The variable length coding circuit 28 variable length codes the output of the quantization circuit 26.

The rate control circuit 32 monitors a data accumulation amount in the buffer 30 and controls the quantization step size of the quantization circuit 26 so that the data accumulation amount does not overflow.

The inverse quantization circuit 38 inversely quantizes the output of the quantization circuit 26 by the same quantization step size as that selected in the quantization circuit 26 and outputs a representative value of a DCT coefficient. The inverse DCT circuit 40 inversely discrete cosine transforms the output of the inverse quantization circuit 38. The switch 50 is opened in the intra-coding mode (I picture) and is closed in the inter-coding mode (P picture or B picture). Therefore, the adder 42 adds a prediction value (output of the motion compensation circuit 46) to the output of the inverse DCT circuit 40 in the inter-coding mode and outputs the output of the inverse DCT circuit 40 as it is in the intra-coding mode.

The motion vector detection circuit 44 compares the pixel data of the present frame from the block formation circuit 20 with the pixel data of the prediction frame from the adder 42, thereby detecting a motion of the image. The motion compensation circuit 46 moves the pixel data of the prediction frame from the adder 42 in the picture plane so as to set off the motion in accordance with the motion vector detected by the motion vector detection circuit 42. The output of the motion compensation circuit 46 is supplied as a prediction value to the adder 42 through the subtractor 48 and switch 50.

The output of the variable length coding circuit 28 is rate adjusted by the buffer 30 and is supplied to the format circuit 34. The format circuit 34 formats the data from the buffer 30 into a recording format of the semiconductor memory 36 and supplies the resultant data to the semiconductor memory 36. Specifically speaking, the format circuit 34 adds various headers such as slice header, sequence header, and the like in the data structure of MPEG1 to the coding data and forms MPEG image data corresponding to the MPEG1 system and writes into the semiconductor memory 36.

The output of the camera signal processing circuit 18 is converted into the analog signal by the D/A converter 52 and is supplied to the electronic view finder 54. Thus, the user can monitor the image during the photographing preparation or the image to be recorded.

The coding data outputted from the buffer 30 can be outputted to an external apparatus via the digital interface 59.

Figure 2:
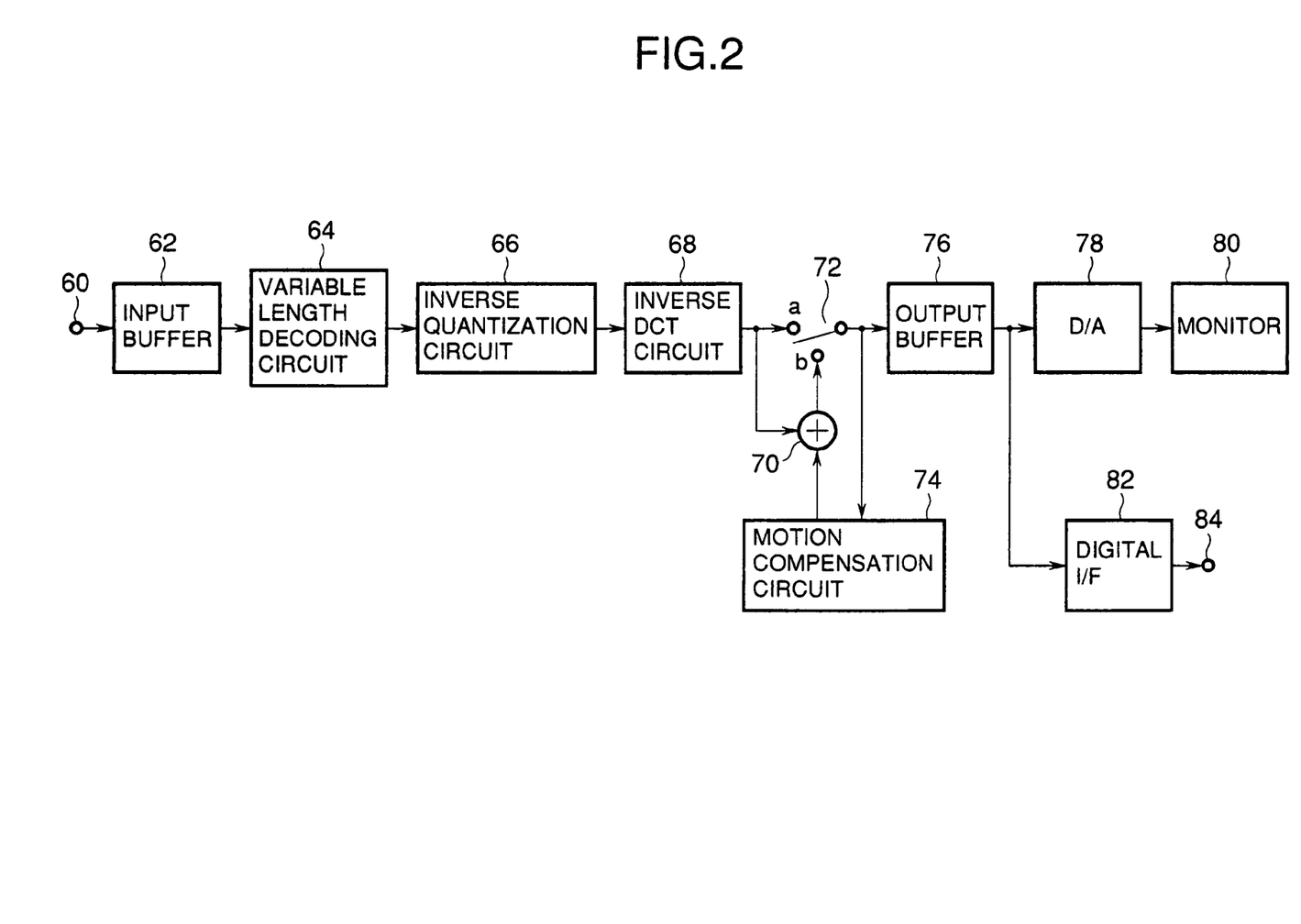
FIG. 2 is a block diagram showing a construction of a digital video reproducing apparatus of the embodiment according to the invention.

FIG. 2 shows a schematic constructional block diagram of the reproducing system for reproducing the image recorded in the semiconductor memory 36 as mentioned above. Reference numeral 60 denotes an input terminal of the coding data read out from the semiconductor memory 36; 62 an input buffer; 64 a variable length decoding circuit; 66 an inverse quantization circuit; 68 an inverse DCT circuit; 70 an adder for adding the prediction value to an output of the inverse DCT circuit 68; 72 a switch for selecting the output (a contact) of the inverse DCT circuit 68 in case of the I picture and selecting an output (b contact) of the adder 70 in case of the P picture or the B picture on the basis of identification information of the coding system; 74 a motion compensation circuit for outputting a prediction value which is motion compensated from an output of the switch 72; 76 an output buffer for storing the output of the switch 72; 78 a D/A converter for converting an output of the output buffer 76 into an analog signal; 80 a monitor for displaying a video image from an output of the D/A converter 78; 82 a digital interface (for example, IEEE1394) for outputting digital output data of the output buffer 76 to the outside; and 84 a digital output terminal.

The coding data inputted to the input terminal 60 is supplied to the variable length decoding circuit 64 through the input buffer 62 and is variable length decoded. An output of the variable length decoding circuit 64 is inversely quantized by the inverse quantization circuit 66 and is inversely DCT transformed by the inverse DCT circuit 68.

An output of the inverse DCT circuit 68 of the I picture is transferred as it is to the output buffer 76 and motion compensation circuit 74 through the switch 72. An output of the inverse DCT circuit 68 of the P picture or the B picture is a differential signal between the picked-up frame and the prediction frame. After the prediction value was added to the output of the inverse DCT circuit 68 by the adder 70, a resultant value is sent to the output buffer 76 and motion compensation circuit 74 through the switch 72. The motion compensation circuit 74 calculates the prediction value to be added by the adder 70 from the data (reconstructed image data) from the switch 72 and supplies to the adder 70.

The output buffer 76 converts the image data according to the block order for compression coding in accordance with the raster order and generates the converted data. The output of the output buffer 76 is supplied to the D/A converter 78 and digital interface 82. The D/A converter 78 converts the output of the output buffer 76 into the analog signal and supplies to the monitor 80 such as a liquid crystal display apparatus or the like. Thus, a reproduction image is displayed. The digital interface 82 outputs the data from the buffer 76 to the digital output terminal 84 in a predetermined format.

In such a camera integrated type recording and reproducing apparatus, when an object image is optically zoomed in/out (enlarged/reduced), the operator operates a zoom lever of the operation unit 58 while monitoring the image. In accordance with the zooming operation, the system control circuit 56 moves a lens for zooming of the photographing lens 10 in the optical axis direction through the zoom drive circuit 12, thereby changing to a desired angle of view. The system control circuit 56 also forcedly connects the switch 22 to the contact for a zooming period of time. Thus, all of the images become the I pictures for the zooming period of time and an increase in unnecessary data amount which is caused because it becomes difficult to obtain a correlation between the picture planes in the continuous enlarging or reducing step of the angle of view during the zooming operation can be prevented. Since the images which are recorded are only the I pictures, the picture quality is also improved.

Figure 3:
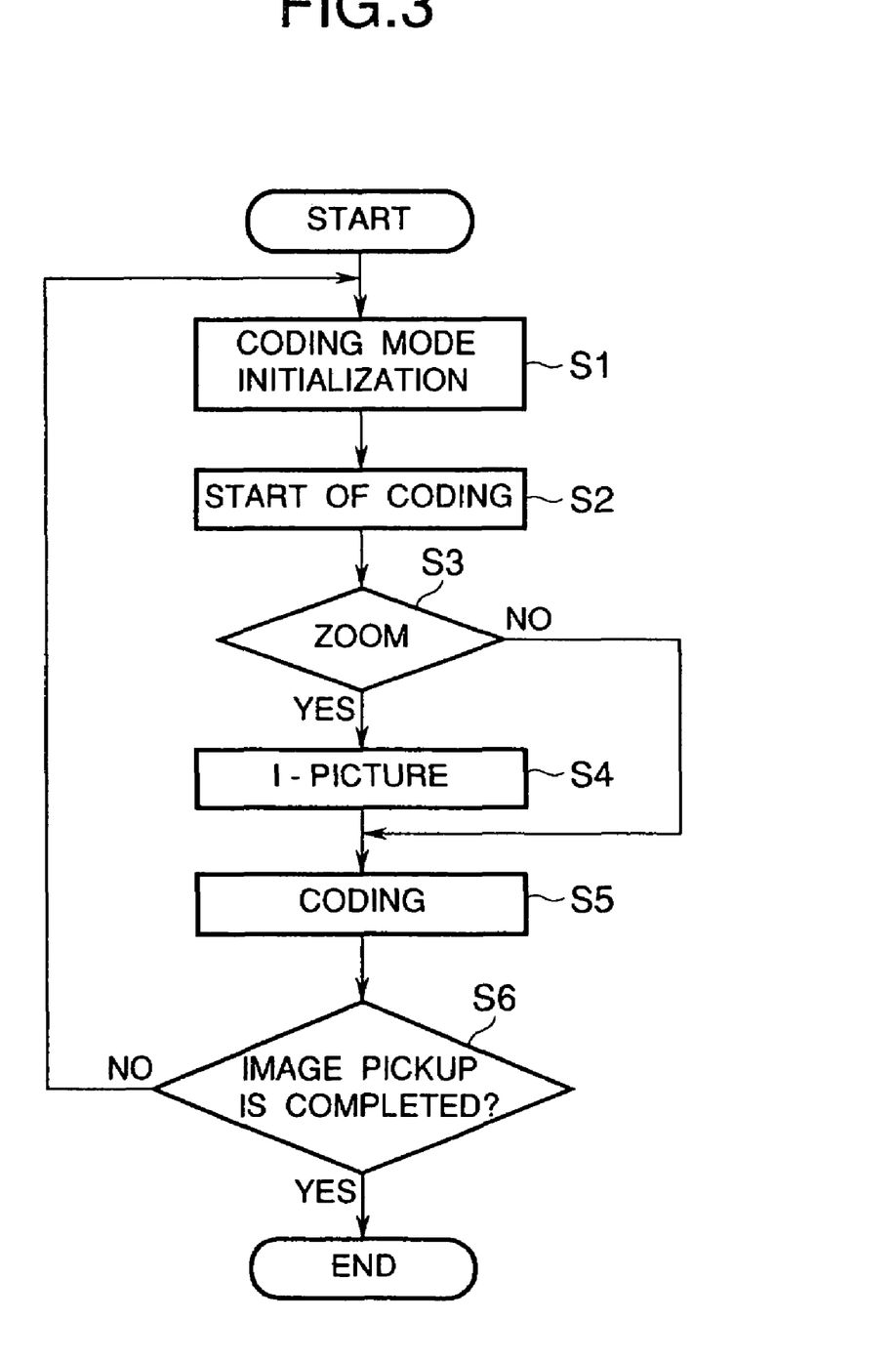
FIG. 3 is a flowchart for the coding mode selecting operation of the embodiment.

A coding mode control during the zooming operation will now be described in detail with reference to FIG. 3. The camera integrated type recording and reproducing apparatus of the embodiment is set into a photographing mode and the photographing operation is started. First, a parameter which is used for coding is initialized (step S1). At this stage, any one of the I picture, P picture, and B picture can be used. In accordance with an instruction to start the recording by the user, the recording of the photographed image, namely, a coding process of the photographed image is started (S2).

The presence or absence of the zooming operation is always monitored (S3). When the zooming operation (zoom-in or zoom-out) is executed, the apparatus is fixed to a coding mode of only the I picture (S4) and the photographed image is coded (S5). When the zooming operation is not performed, the photographed image is coded in a coding mode using the I picture, P picture, and B picture in the ordinary manner (S6).

The processes after step S1 are repeated (S6) until the operation to finish the photographing (recording) is performed. The photographing is finished by the photographing finishing operation.

In the embodiment, as mentioned above, since the process is limited to the coding process of only the I picture for the zooming operation, an extreme increase in coding data amount during the zooming operation can be prevented, so that the deterioration of the image can be suppressed.

In association with the high magnification of the photographing optical system, the embodiment is suitable, particularly, for a case where the zoom can be controlled at an extremely high speed. The invention can be obviously applied to an electronic zoom besides the optical zoom.

Although the embodiment using the semiconductor memory as a recording medium has been described, a magnetic tape, a magnetic disk, or a magnetooptic disk can be also used as a recording medium.

The image compressing system is not limited to the MPEG1 system but can also use an MPEG2 system, or further, another coding system using both of the inter-picture plane coding and the intra-picture plane coding.

Figure 4:
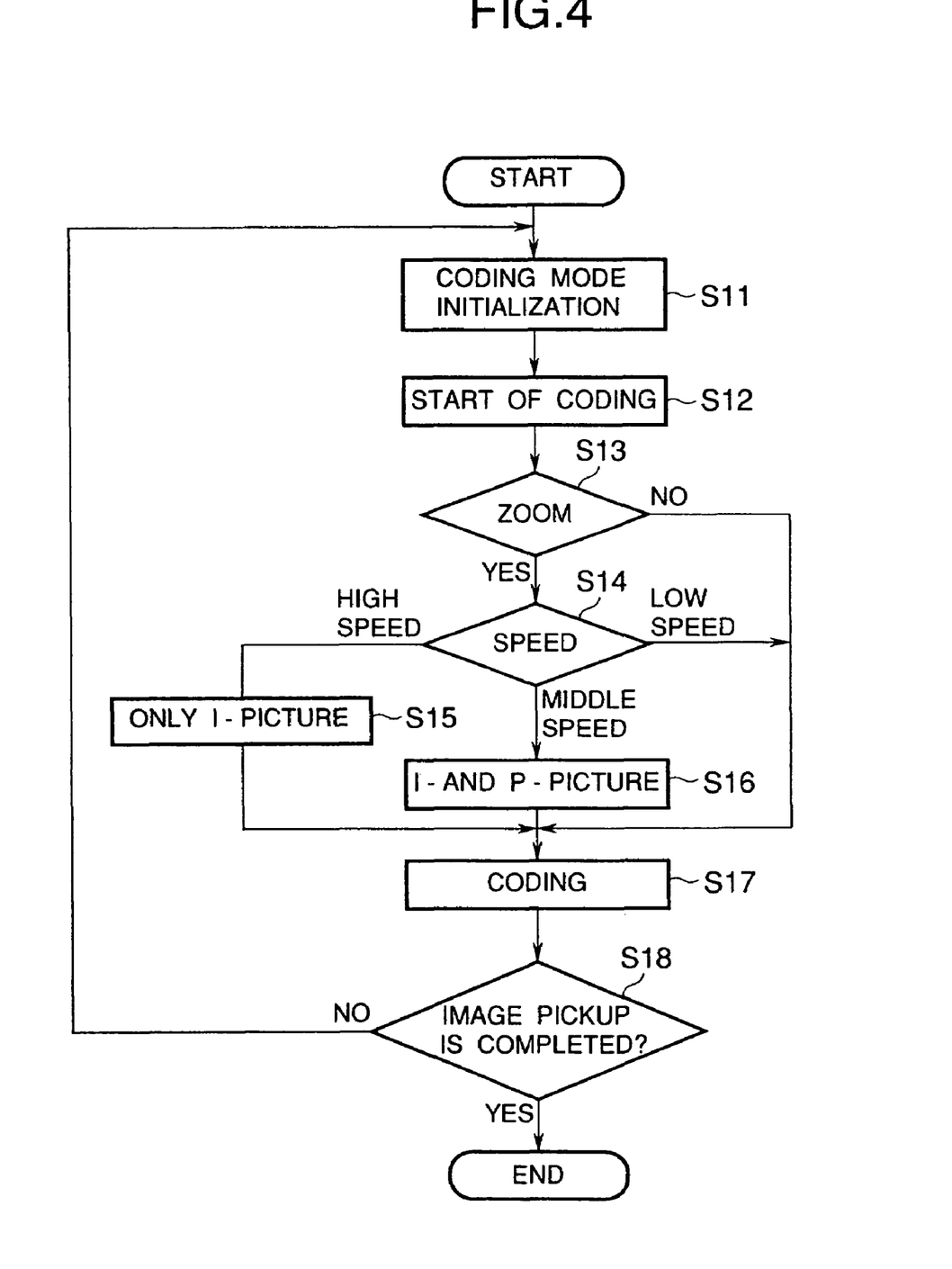
FIG. 4 is a flowchart for the coding mode selecting operation according to another embodiment.

In recent years, since a zoom magnification is increasing and a request for a moving time between the wide angle end and the telescope end is almost unchanged, a zooming speed is eventually raised. On the other hand, since a trimming of a delicate angle of view is also required, a low speed driving has to be also enabled. In the above embodiment, since only the I picture is used during the zooming operation irrespective of the zooming speed, when the zooming speed is low, a coding efficiency deteriorates. To solve such a problem, it is sufficient to select the coding mode in accordance with the zooming speed. FIG. 4 shows a flowchart for the coding mode selection according to a modification.

First, the parameter which is used for coding is initialized (S11). At this stage, any one of the I picture, P picture, and B picture can be used. In accordance with the instruction to start the recording by the user, the recording of the photographed image, namely, a coding process of the photographed image is started (S12).

The presence or absence of the zooming operation is always monitored (S13). When the zooming operation (zoom-in or zoom-out) is executed, the zooming speed is examined (S14). When the zooming speed is high, the apparatus is fixed to the coding mode of only the I picture (S15) and the photographed image is coded (S17). When the zooming speed is middle, the apparatus is set into the coding mode using the I picture and the P picture (S16). The photographed image is coded (S17). When the zooming speed is low or the zooming operation is not performed (S13, S14), the photographed image is coded in the coding mode using the I picture, P picture, and B picture in the ordinary manner (S17).

The processes after step S11 are repeated (S18) until the operation to finish the photographing (recording) is performed. The photographing is finished by the photographing finishing operation.

Hitherto, the presence or absence of the correlation between the picture planes has been discriminated by the detection result of the motion vector between the picture planes. However, in a case where the whole picture plane changes while changing the angle of view like a zoom photographing, it is difficult to properly discriminate the correlation between the picture planes by the simple block matching. Like the embodiment, by controlling an image compressing condition in accordance with photographing condition information from the camera system, an image compression can be efficiently performed at a high picture quality.

The second embodiment according to the invention will now be described hereinbelow with reference to the drawings.

Figure 5:
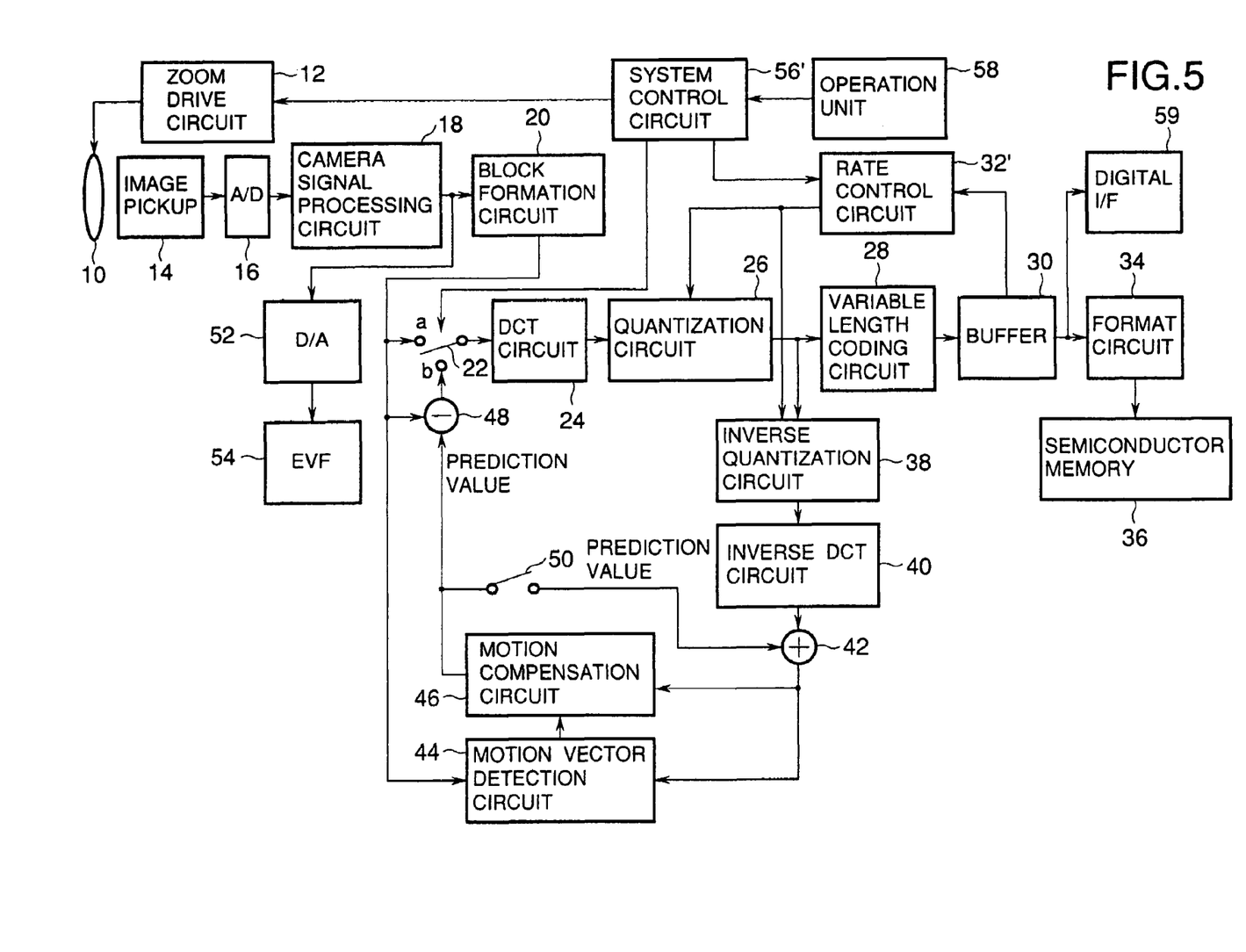
FIG. 5 is a block diagram showing a construction of a digital video camera of the second embodiment according to the invention.

FIG. 5 is a block diagram showing a construction of a digital video camera of the second embodiment according to the invention. In FIG. 5, the same portions as those in FIG. 1 are designated by the same reference numerals and their descriptions are omitted.

In the second embodiment, in addition to the coding mode control by the zooming operation in the first embodiment, a quantization step size is further controlled. The embodiment is made by paying attention to an idea such that when the zooming operation is being performed, the photographer pays an attention to an object existing at a far end of the zoom and he ought to obviously desire that a person who observes the video image also pays an attention to such a target portion. That is, since the center of the picture plane is a focal point of the zoom, a quantization step size of the image data near the center of the picture plane is set to be smaller than that of the other portion, thereby allocating a larger code amount to such image data. In other words, a picture quality of the image in the center portion. This also provides an effect of preventing a raid increase in code amount due to the change in coding mode.

Specifically speaking, a system control circuit 56' supplies zoom operation information (also including information of the zooming speed and the like) showing the contents of the zooming operation to a rate control circuit 32'. The rate control circuit 32' controls the quantization step size which is used for a quantizing process in consideration of the zooming operation information.

Figure 6A:
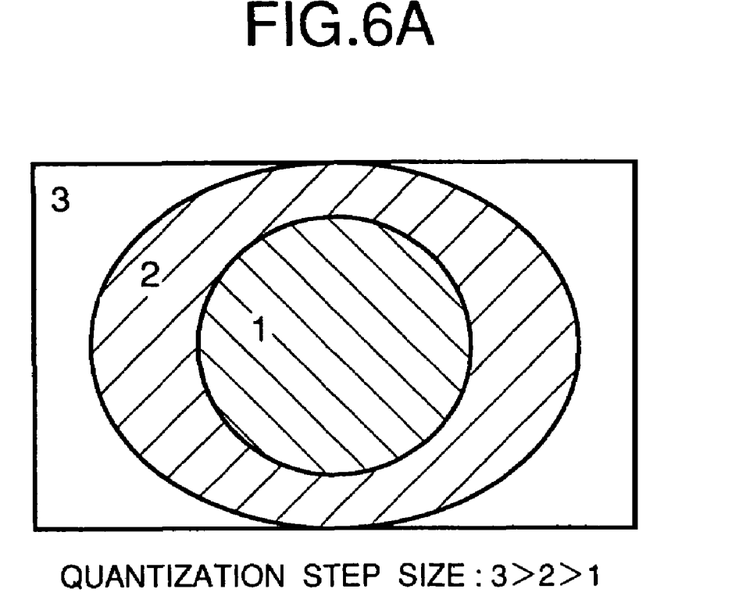
FIGS. 6A and 6B diagrams for explaining a quantization step control of the second embodiment.
Figure 6B:
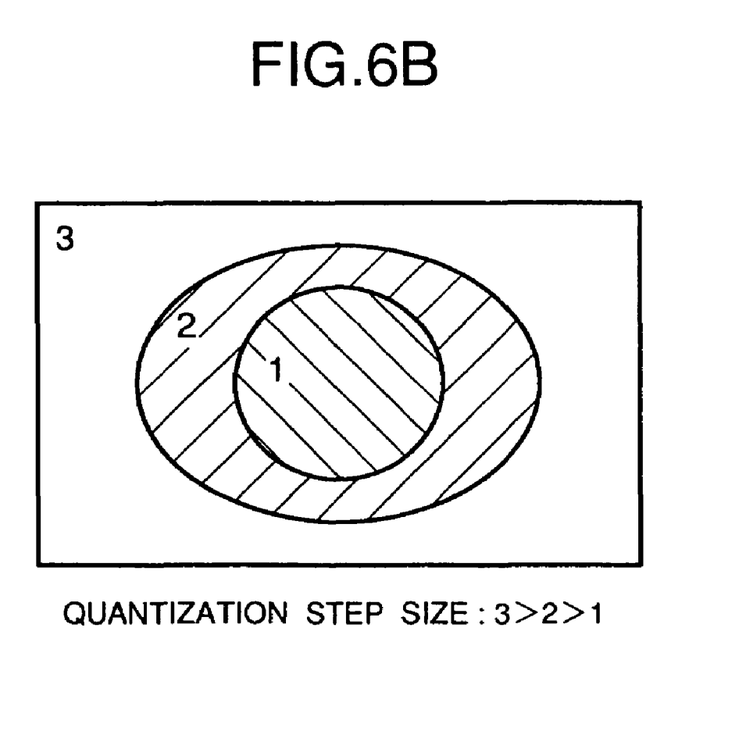

FIGS. 6A and 6B are diagrams for explaining the relation among the quantization step sizes at the time of the zooming operation.

In FIGS. 6A and 6B, one picture plane is divided into three areas concentrically from the center of the picture plane and the quantization step size is reduced as the position approaches the center of the picture plane. In the embodiment, although one picture plane has been divided into three areas, it can be also further finely divided into the areas.

FIG. 6A shows a case of the middle zooming speed. FIG. 6B shows a case of the high zooming speed. When the zooming speed is low, the quantization step is executed by an ordinary rate control process.

Figure 7:
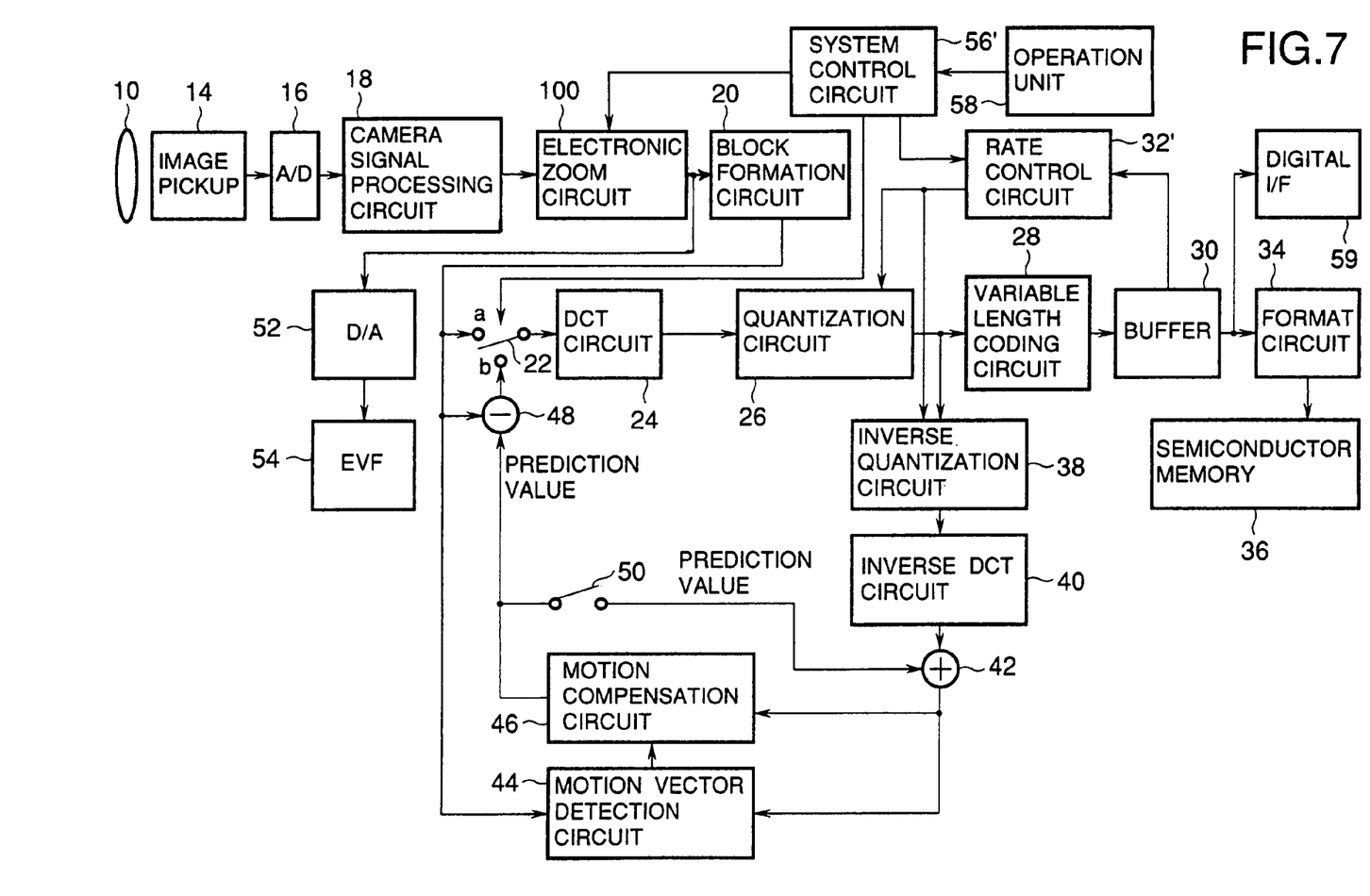
FIG. 7 is a block diagram showing a construction of a digital video camera of another embodiment according to the invention.

Although the zooming process of the image has been optically performed in the first and second embodiments, the invention can be also applied to a case of electrically performing the zooming process (electronic zoom) instead of the optical method. Such a constructional example is shown in FIG. 7. It is sufficient that the system control circuit 56' controls an electronic zoom circuit 100 in accordance with the operation of the zoom lever of the operation unit 58.

In other words, the foregoing description of embodiments has been given for illustrative purposes only and not to be construed as imposing any limitation in every respect.

The scope of the invention is, therefore, to be determined solely by the following claims and are not limited by the text of the specifications and alterations made within a scope equivalent to the scope of the claims fall within the true spirit and scope of the invention.

What is claimed is:

1. A digital video camera apparatus comprising:
   an image pickup unit, adapted to generate an image signal;
   a camera signal process unit, adapted to process the image signal to be corrected;
   a display unit, adapted to input the image signal from said camera signal process unit, and to monitor the image during preparation for photographing of the image to be recorded;
   a zoom unit having a zoom operation member, adapted to direct an optical lens for zooming;
   a speed discriminating unit, adapted to discriminate a plurality of zoom speeds of said zoom unit; and
   an encoding unit, adapted to encode the image signal from said camera signal process unit in a plurality of coding modes,
   wherein said encoding unit (1) is set in a coding mode which uses an I-picture, a P-Picture, and a B-Picture, in a case in which a discrimination result of said speed discriminating unit indicates one of a first zoom speed and no zoom operation, (2) is set in a coding mode which uses only the I-picture and the P-picture, in a case in which the discrimination result indicates a second zoom speed, and (3) is set in a coding mode which uses only the I-picture, in a case in which the discrimination result indicates a third zoom speed.

2. An apparatus according to claim 1, wherein the zoom operation member is a zoom lever.

3. An apparatus according to claim 1, wherein said camera signal process unit includes at least one of a gamma correction process and a color balance correction process.

4. An apparatus according to claim 1, wherein said encoding unit includes a quantizer arranged to quantize the image data, wherein the quantizer controls a quantization step in accordance with an operation of the zoom operation member.

5. An apparatus according to claim 4, wherein said quantizer is adapted to control the quantization step in accordance with a speed of the optical lens for zooming.

6. An apparatus according to claim 5, wherein said quantizer is adapted to control a quantization step in a center direction of a picture plane so as to be smaller than a quantization step in a periphery of the picture plane.

7. An apparatus according to claim 1, further comprising a recording unit, adapted to record the image data encoded by said encoding unit on a recording medium.

8. An apparatus according to claim 1, further comprising a digital interface, adapted to transmit the image data encoded by said encoding unit to an external apparatus.

9. An apparatus according to claim 1, wherein said encoding unit is based on a Moving Picture Experts Group (MPEG) system.

10. An apparatus according to claim 1, wherein the first zoom speed is lower than the second zoom speed.

11. An apparatus according to claim 1, wherein the second zoom speed is lower than the third zoom speed.

12. A control method for a digital video camera apparatus, comprising:
- an image pickup step of generating an image signal;
- a camera signal process step of processing the signal to be corrected;
- a displaying step of inputting the image signal processed in said camera signal process step, and monitoring the image during preparation for photographing of the image to be recorded;
- a zoom operation step of operating a zoom unit having a zoom operation member, and directing an optical lens for zooming;
- a speed discriminating step of discriminating a plurality of zoom speeds of said zoom unit; and
- an encoding step of encoding the image signal from said camera signal process step in a plurality of coding modes,
- wherein said encoding step includes (1) setting in a coding mode which uses an I-picture, a P-Picture, and a B-Picture, in a case in which a discrimination result obtained in said speed discriminating step indicates one of a first zoom speed and no zoom operation, (2) setting in a coding mode which uses only the I-picture and the P-picture, in a case in which the discrimination result indicates a second zoom speed, and (3) setting in a coding mode which uses only the I-picture, in a case in which the discrimination result indicates a third zoom speed.

13. A method according to claim 12, wherein the zoom operation member is a zoom lever.

14. A method according to claim 12, wherein said encoding step is based on a Moving Picture Experts Group (MPEG) system.

15. A method according to claim 12, wherein said camera signal process step includes at least one of a gamma correction processing step and a color balance correction processing step.

16. A method according to claim 12, wherein said encoding step includes a quantizing step of quantizing the image data, wherein said quantizing step controls a quantization step in accordance with an operation of the zoom operation member.

17. A method according to claim 16, wherein said quantizing step controls the quantization step in accordance with a speed of the optical lens for zooming.

18. A method according to claim 17, wherein said quantizing step controls a quantization step in a center direction of a picture plane so as to be smaller than a quantization step in a periphery of the picture plane.

19. A method according to claim 12, further comprising a recording step of recording the image data encoded in said encoding step on a recording medium.

20. A method according to claim 12, further comprising a transmitting step of transmitting the image data encoded in said encoding step to an external apparatus via a digital interface.

21. A method according to claim 12, wherein the first zoom speed is lower than the second zoom speed.

22. A method according to claim 12, wherein the second zoom speed is lower than the third zoom speed.

* * * * *